(12) United States Patent
Grandinetti et al.

(10) Patent No.: US 9,792,641 B1
(45) Date of Patent: Oct. 17, 2017

(54) SYSTEMS AND METHODS FOR MANAGING PRODUCT LIST SUBSCRIPTIONS

(71) Applicant: Amazon Technologies, Inc., Reno, NV (US)

(72) Inventors: Russell C. Grandinetti, Seattle, WA (US); Jeffrey Paul Helbling, Seattle, WA (US); Ozgur Dogan, Seattle, WA (US); Melissa K. Eamer, Seattle, WA (US); Michael Schleif Pesce, Seattle, WA (US); Deepak Kaushik, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 772 days.

(21) Appl. No.: 13/930,362

(22) Filed: Jun. 28, 2013

(51) Int. Cl.
  *G06Q 30/00* (2012.01)
  *G06Q 30/06* (2012.01)

(52) U.S. Cl.
  CPC ................. *G06Q 30/0631* (2013.01)

(58) Field of Classification Search
  CPC .......................... G06Q 30/06–30/08
  USPC ............................... 705/26.1–27.2
  See application file for complete search history.

(56) References Cited

U.S. PATENT DOCUMENTS

| | | | | |
|---|---|---|---|---|
| 7,756,753 | B1* | 7/2010 | McFarland | G06Q 30/02 705/26.1 |
| 2004/0078274 | A1* | 4/2004 | Aarnio | G06Q 30/0239 705/26.8 |
| 2005/0033650 | A1* | 2/2005 | Robertson | G06Q 30/02 705/26.8 |
| 2010/0169160 | A1* | 7/2010 | Wu | G06Q 30/02 705/14.4 |
| 2012/0158622 | A1* | 6/2012 | Mital | G06Q 50/01 706/12 |

* cited by examiner

*Primary Examiner* — Ethan D Civan
(74) *Attorney, Agent, or Firm* — Eversheds Sutherland (US) LLP

(57) ABSTRACT

This disclosure relates to systems and methods for managing product list subscriptions. In one embodiment, a method may be provided. The method may include determining, by a server comprising one or more processors, user profile information for a user, the user profile information indicating a book list to which the user is subscribed. The method may also include accessing the book list, wherein the book list comprises one or more book identifiers, a creator identifier for a creator of the book list, and a genre identifier. Furthermore, the method may include generating a recommendation for the user to purchase a book that that is classified by the genre identifier. Additionally, the method may include transmitting, to the user, the recommendation to purchase the book.

23 Claims, 5 Drawing Sheets

SYSTEMS AND METHODS FOR MANAGING PRODUCT LIST SUBSCRIPTIONS

BACKGROUND

Online social media has become increasingly prevalent as a means for sharing information. In particular, users of social media frequently share interests and hobbies with other users and friends. Accordingly, demand for improving techniques for sharing data within the framework of online social media has grown as well.

Figure 1:
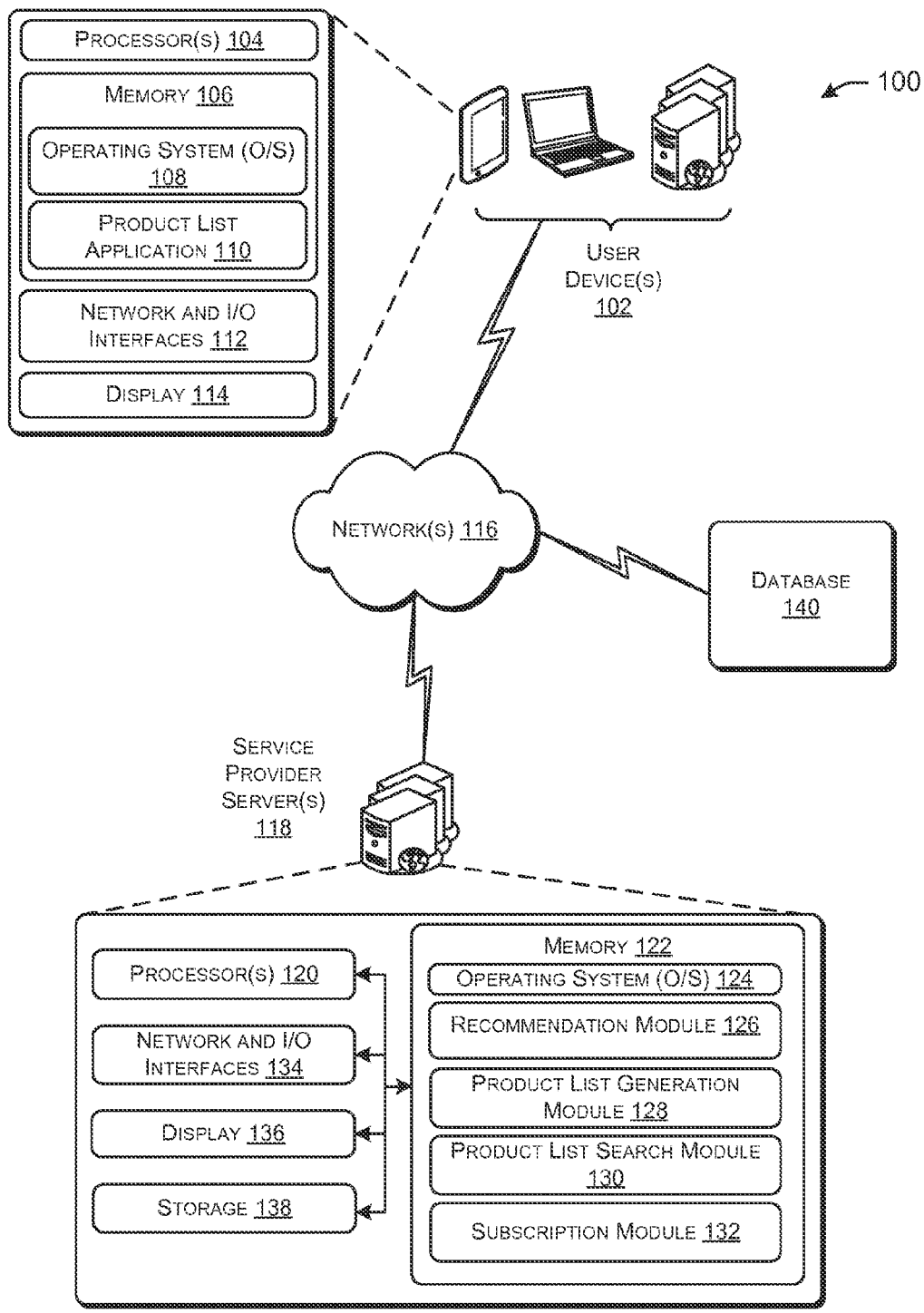
FIG. 1 illustrates a system for managing product list subscriptions in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for managing product list subscriptions. Broadly, the systems and methods described herein may enable a user to create a product list, which may include one or more product identifiers of the user's choosing. In some cases, the one or more product identifiers may indicate the user's interest in certain products. The systems and methods described herein may also enable users to subscribe to user-generated product lists. For instance, a user may create a book list (which may be a type of product list), which may include one or more book identifiers. These book identifiers may correspond to books that the user is currently reading, the user has purchased, and/or that the user considers particularly interesting. Once a user has created the book list, the user may share the book list with other users. In some instances, in order to share the book list, a hyperlink may be generated for another user that when selected by that user, may cause a user device to display certain aspects of the book list, such as the book identifiers, a creator identifier, and/or other information. As will be appreciated by one or ordinary skill in the art, the user may be able to share the hyperlink to other users using various types of communications, application programming interfaces (APIs), programs, social media sites, and/or the like.

According to some embodiments, a user may also be able to subscribe to a product list (e.g., the book list) created by another user, or a creator. As such, the user/subscriber of the book list may be notified when new book identifiers are added to the book list by the creator. Furthermore, the systems and methods described herein may be configured to transmit one or more book recommendations (or other product recommendations) to the subscriber based at least in part on information associated with the book lists. For instance, the one or more book identifiers included in the book list may belong to or may otherwise be associated with a genre. Thus, the systems and methods described herein may be configured to transmit, to the subscriber, a recommendation to purchase a book that belongs to the genre. Additionally, recommendations for book lists (or other product lists) may also be transmitted to the subscriber, such a recommendation for another book list generated by the same creator. Furthermore, systems and methods described herein may facilitate searches for product lists using various search criteria. It should be noted that while certain aspects of the disclosure may describe product lists in terms of book lists and book identifiers (both digital copies and physical copies), such lists may encompass various other types of products and/or areas of interest including, but not limited to, fashion, electronic devices, restaurants, food, toys, and/or the like.

According to one or more embodiments of the disclosure, a method is provided. The method may include determining, by a server comprising one or more processors, user profile information for a user, the user profile information for a user. The user profile information may indicate a book list to which the user is subscribed. The method may also include accessing the book list, wherein the book list comprises one or more book identifiers, a creator identifier for a creator of the book list, and a genre identifier. Furthermore, the method may include generating a recommendation for the user to purchase a book that is classified by the genre identifier. Additionally, the method may include transmitting, to the user, the recommendation to purchase the book. The method may also include receiving a request from the creator to add a new book identifier to the book list, and determining, in response to the request from the creator, whether to add the new book identifier to the book list. The method may further include transmitting, to the user upon a positive determination to add the new book identifier to the book list, a notification comprising the new book identifier.

According to one or more other embodiments of the disclosure, a user device is provided. The user device may include at least one memory for storing data and computer-executable instructions. Additionally, the user device may also include at least one processor to access the at least one memory and to execute the computer-executable instructions. Furthermore, the at least one processor may be configured to execute the instructions to access a product list, the product list comprising one or more product identifiers, a subscriber identifier, a category identifier, and a creator identifier for a creator of the product list. The at least one processor may also be configured to execute the instructions to determine, based at least in part on the subscriber identifier, a subscriber of the product list. Additionally, the at least one processor may be configured to execute the instructions to generate a recommendation for the subscriber to purchase a product associated with the category identifier and transmit, to the subscriber, the recommendation to purchase the product.

According to one or more embodiments of the disclosure, a non-transitory computer-readable medium is provided. The non-transitory computer-readable medium may have embodied thereon instructions executable by one or more processors. The instructions may cause the one or more processors to receive, from a user, one or more search criteria included in a search request. Furthermore, the instructions may cause the one or more processors to determine, based at least in part on the one or more search criteria in the search request, a product list comprising one or more product identifiers and a creator identifier associated with a creator of the product list. Additionally, the instructions may cause the one or more processors to receive, from the user, a subscription request for the product list and store, in response to the subscription request, an association between a user profile of the user and the product list, the association indicating the user's subscription to the product list.

With reference now to FIG. 1, a system 100 for managing product list subscriptions is shown according to one or more embodiments of the disclosure. The system 100 may include one or more user device(s) 102. In general, the user device 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The user device(s) 102 may include one or more computer processors 104, a memory 106 storing an operating system 108 and a product list application 110, network and I/O interfaces 112, and a display 114. In certain embodiments, the user device(s) 102 may include one or more sensors capable of gathering information associated with a present environment of the user device(s) 102, or similar hardware devices, such as a camera, microphone, antenna, or Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 102 may also include a chipset (not shown) for controlling communications between the one or more processors 104 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may comprise one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the user device 102. The memory 106 may also store content that may be displayed by the user device 102 or transferred to other devices (e.g., headphones) to be displayed or played by the other devices. The memory 106 may also store content received from the other devices. The content from the other devices may be displayed, played, or used by the user device 102 to perform any necessary tasks or operations that may be implemented by the computer processor or other components in the user device 102. Furthermore, the memory 106 may store a product list application 110 to facilitate managing and subscribing to one or more product lists, as described in more detail below.

The network and I/O interfaces 112 may also comprise one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 114 may include, but is not limited to, a liquid crystal display, a light-emitted diode display, an E-Ink™ display as made by E Ink Corp. of Cambridge, Mass., or any other similar type of output device. The display 114 may be used to show content to a user in the form of text, images, or video. In certain instances, the display 114 may also operate as a touch screen display that may enable the user to initiate commands or operations by touching the screen using certain finger or hand gestures.

According to one or more embodiments, the user device 102 may be in communication, via one or more networks 116, with one or more service provider server(s) 118. As used herein, unless otherwise specified, the term "server"

may refer to any computing device having a networked connectivity and configured to provide one or more dedicated services to clients, such as a user device 102. The services may include storage of data or any kind of data processing. One example of the server may include a web server hosting one or more web pages. Some examples of web pages may include social networking web pages and/or social media websites. Another example of a server may be a cloud server that hosts web services for one or more computer devices.

As such, the service provider server(s) 118 may include one or more processors 120 and a memory 122. As such, the memory 122 may store an operating system 124, a recommendation module 126, a product list generation module 128, a product list search module 130, and a subscription module 132. In addition, the service provider server(s) 118 may also include network and I/O interfaces 134, a display 136, and storage 138.

Furthermore, as shown in the embodiment of FIG. 1, a database 140 can be accessible by the user devices 102 and/or service provider computers 118 via the network(s) 116. The database 140 can include any type of data storage device and/or any number of data storage devices.

Thus, in some embodiments, the product list application 110 included in the user device 102 may facilitate creation and management of product lists and subscriptions to the product lists. In some implementations, the product list application 110 may be a dedicated application on the user device 102 and may communicate with various components in the service provider server(s) 118 (e.g., recommendation module 126, product list generation module 128, and/or product list search module 130). In other implementations, instead of the product list application 110, a user may interface with a web browser (not pictured) included on the user device 102 to communicate with the various modules of the service provider server 118. For example, the web browser may be configured to present a web page (e.g., served by the service provider server 118 or another server) to the user. The web page may include a user interface in which the user may be able to input information used to create and/or manage product lists. It should be understood that the functionality provided by the product list application 110 and the above modules may be distributed variously among the user device(s) 102, the service provider server(s) 118, other third-party devices, and/or any combination thereof.

As mentioned above, the product list application 110 may be configured to create one or more product lists. A product list may include, store, display, or may be otherwise associated with one or more product identifiers. These product identifiers may correspond to, point to, and/or otherwise represent actual products for sale, such as by a service provider of the service provider server(s) 118. Thus, according to some implementations, a product list may be generally construed as a collection of product identifiers, though the product list may store other information as well, as will be described below and with reference to FIGS. 1 and 2. In certain embodiments, the user device(s) 102, service provider server(s) 118, and/or any other component of the system 100 may be configured to display the product list, the included product identifiers, images of the actual products, and/or any other information included in the product list. In certain embodiments, a product list may be a book list associated with one or more book identifiers pointing to or otherwise indicating actual books for sale. Furthermore, while the description may refer to product lists as books lists in some exemplary embodiments, it will be appreciated that other types of product lists are also possible.

According to certain embodiments, the product list application 110 may receive a request (e.g., from a user/creator) to generate a product list. In some implementations, in order for users/creators to generate a product list, the users/creators must be enrolled and/or registered with a service for managing product list subscriptions. Such a service may be provided by an online merchant, owner, and/or any other service provider that may operate, own, or otherwise be associated with the service provider server(s) 118. Furthermore, the service may enable a user profile to be stored and/or associated with an enrolled user, and the user profile may include a unique user identifier for the enrolled user. User profiles and information associated with user profiles may be discussed in more detail with reference to FIG. 2 below.

Continuing with the product list application 110, in response to the request to generate a product list, the product list application 110, the service provider server 118, and/or another entity included in the system 100 may prompt the user/creator, such as via a user interface (not pictured), to enter certain information. In some embodiments, this information may be transmitted to the product list generation module 128 associated with the service provider server(s) 118. To this end, the product list generation module 128 may be configured to create and/or generate, based at least in part on the above information, a product list for the creator. The above information may include, but is not limited, a creator identifier for the creator (e.g., the creator identifier may point to the unique user identifier of the creator), contact information of the creator, one or more product identifiers, product categories in which the product identifiers may belong, messages to potential subscribers/followers, and/or other types of information. Thus, once the product list has been generated, the product list may store, include, and/or otherwise be associated with the above information. In some embodiments, certain restrictions may be associated with the creation and/or management of the product lists. For instance, the creator may be limited in adding a number of product identifiers corresponding to free products to the product list. For example, for a particular product list such as a book list, the number of book identifiers corresponding to free books that the user may be allowed to include in the book list may be limited by a predetermined threshold and/or predetermined threshold ratio. To this end, the predetermined threshold may be a predefined number of book identifiers corresponding to a number of free books, for example, 10 free books. Likewise, the predetermined threshold ratio may include a ratio of a number of book identifiers corresponding to free books and a number of book identifiers corresponding to priced books. In certain examples, a predetermined threshold ratio may be 1:1, but it will be appreciated that any other ratios may also be acceptable. As another example, a user/creator may be restricted to adding product identifiers corresponding to actual products that have been purchased by the user and/or stored on the user device(s) 102. For instance, a user/creator may be associated with an e-book reader having stored thereon certain e-books. As such, in creating a book list, the user/creator may only be allowed to add book identifiers corresponding to e-books stored on the e-book reader.

In any instance, once the product list has been generated, the product list generation module 128 may be configured to store the product list in the database 140, the service provider server(s) 118, the user device(s) 102, and/or any other storage locations. Furthermore, once the product list has been generated, the product list application 110 may enable the creator to add one or more product identifiers to the product list. For example, the user may request (e.g., via a user interface) to add a new product identifier to the product list. The product list application 110 may receive the request and may be configured to determine a ratio, for book identifiers included in the product list, between a number book identifiers corresponding to free books and a number of book identifiers corresponding to paid books. As such, the product list application 110 may determine whether this ratio exceeds the above mentioned predetermined threshold ratio. As one example embodiment, upon a positive determination that the ratio exceeds the predetermined threshold ratio, the product list application 110 may transmit a notification to the creator. The notification may indicate an over-threshold violation and may also indicate a rejection of the request to add the new product identifier. Alternatively, upon a negative determination that the ratio does not exceed the predetermined threshold ratio, the product list application 110 may transmit the new product identifier to the product list generation module 128. To this end, the product list generation module 128 may be configured to add the new product identifier to the product list.

In some embodiments, the product list application 110 and/or the product list generation module 128 may enable a creator to share a product list. For example, the product list application 110 and/or the product list generation module 128 may be configured to generate a hyperlink associated with the product list. When the hyperlink is selected, such as via a web browser on a user device 102, the user device 102 may be configured to display, on a web page, the product list, product list identifiers, images associated with the product list identifiers and/or with actual products, creator identifiers, and/or any other information included in the product list. As will be appreciated by one or ordinary skill in the art, the user, client device 102, and/or service provider computer 118 may be able to share the hyperlink with one or more other users using various communication interfaces and/or providing the hyperlink to one or more application programming interfaces (APIs), programs, social media sites, and/or the like.

Additionally, while FIG. 1 illustrates the database 140 as a stand-alone component, it should be understood that the database 140, and/or a portion thereof, may also be included within the service provider server(s) 118, the user device(s) 102, and/or any other device. Furthermore, the database 140 may be configured to store a wide variety of information related to product lists, such as user identifiers, creator identifiers, subscriber identifiers and/or the like. Thus, in certain embodiments, the database 140 may be searched to retrieve, receive, determine, and/or otherwise access information related to product lists.

According to one or more example embodiments, the product list application 110 may also be configured to facilitate searches for product lists and/or any other information included in and/or otherwise associated with product lists. Broadly, these searches may be performed according to various search criteria including, but not limited to, a product category, a product list identifier, a creator identifier, a subscriber identifier, a number of subscriptions, and/or any other types of information that may be stored in or otherwise be associated with a product list. Examples of such information are described in more detail below with reference to FIG. 2. As one example, the product list application 110 may be configured to access and/or receive search criteria (e.g., from the user device(s) 102). The product list application 110 may then transmit the search criteria to the product list search module 130. As such, the product list search module 130 may be configured to access the database 140 and/or any other data storage device where product lists may be stored. The product list search module 130 may also be configured to identify a product list that includes information matching and/or otherwise corresponding to the search criteria. Furthermore, the product list search module 130 may return or transmit any identified product lists to the user, via the user device 102, as search results. Additionally, the product list search module 130 may present the user, via the user device 102, with an option of subscribing to any of the product list search results.

As one example, the product list application 110 may facilitate a product list search according to a creator identifier by way of receipt of corresponding user input via a user device 102 (e.g., a user may wish to search for product lists generated by particular creators, such as a notable person, celebrity, friend, and/or the like). As such, the creator identifier may include any information that can be used to ascertain a creator, such as a string of characters, an identification number, and/or the like. For instance, a user may wish to discover book lists created by Phil Jackson. Thus, the user may input the string "Phil Jackson" as a search parameter to the product list application 110, which may provide the string to the product list search module 130. In response, the product list search module 130 may perform a search of the database 140 and/or any other data storage device, and provide the user with any product lists, including any book lists, associated with a creator identifier matching the string "Phil Jackson." To this end, the user may be provided the option (e.g., via the user device 102) of subscribing to one or more of the resulting product lists.

As another example, the product list application 110 may facilitate a search for product lists that belong to a particular category/category identifier. As such, a category/category identifier may include any information that can be used to ascertain a category, such as a string of characters, an identification number, and/or the like. To this end, a product list may belong to a particular category if one or more product identifiers included in the product list belong to that particular category. For instance, the user may wish to search for book lists that belong to the "Fantasy" genre. Thus, the user may input the string "Fantasy," which may be received by the product list application 110. The product list application 110 can transmit the string to the product list search module 130, which may be configured to search the database 140 and/or any other data storage device for a book list which belongs to a genre matching the string "Fantasy" (e.g., the book list includes one or more book identifiers which belong to the "Fantasy" genre). To this end, the user may be provided the option (e.g., via a user device 102) of subscribing to one or more of the resulting book lists.

While the product list application 110 and/or the product list search module 130 may facilitate searching for product lists based on different criteria, it should be noted that the system 100 may also be configured to enable the user to browse for product lists as well (e.g., by creator identifiers, category identifiers, and/or any other information stored in or otherwise associated with product lists). Furthermore, it should also be noted that a product list can belong to and/or may otherwise be associated with multiple category identifiers. For example, consider a scenario in which the product list is a book list. With respect to a book list, product identifiers may be referred to as book identifiers and category identifiers may be referred to as genre identifiers. This end, the book list may include a first book identifier that belongs to a "Fiction" genre identifier and a second book identifier that belongs to a "Literature" genre identifier. Accordingly, genre identifiers included in the book list may indicate or otherwise be associated with the "Fiction" and "Literature" genre identifiers.

According to one or more embodiments, the product list application 110 may also facilitate user subscriptions to one or more product lists. For instance, a user may indicate, to the product list application 110, a request to subscribe to a product list. Such a request may be transmitted to the subscription module 132, which may be configured to store a subscription association between the user and the product list. Such an association may be accomplished by storing a subscriber identifier in the product list. The subscriber identifier may be a copy of a unique user identifier for the user; alternatively the subscriber identifier may be a pointer to the unique user identifier for the user. It will be appreciated that the subscriber identifier and/or the unique user identifier for the user may be stored elsewhere from the product list, such as the user device 102, service provider server 118, database 140, and/or any other data storage device. Thus, each subscription to a product list by respective users may result in the association of respective subscriber identifiers of those users to the product list.

Furthermore, the subscription module 132 may also be configured to transmit/communicate, to subscribers of a product list, updates, alerts, notifications and/or the like. In some embodiments, such notifications may indicate one or more new product identifiers added to the product list (e.g., by the creator of the product list). For example, a user may be subscribed to a book list. At a certain point in time while the user is subscribed to the book list, the creator of the book list may add a new book identifier to the book list. As such, the subscription module 132 may receive an indication of the new book identifier (e.g., from the product list generation module 128). Alternatively, the subscription module 132 may be configured to monitor product lists periodically to determine whether new product identifiers are added to product lists. Continuing with reference to the new book identifier, the subscription module 132 may generate a notification that may include or that otherwise be associated with the new book identifier. As such, the subscription module 132 may transmit the notification to the user and/or other subscribers of the book list. It will be appreciated that various parameters with respect to the notifications (e.g., frequency and/or method of communication such as email, text, etc.) may be configurable by a user via the user device 102.

Moreover, in certain implementations, in addition to notifying subscribers of a new product identifier added to a product list, the product list application 110 and/or the subscription module 132 may also facilitate automatic purchase transactions, on behalf of the subscribers, for the product corresponding to the new product identifier. It will be appreciated that such automatic purchase transactions may be presented as an option (e.g., via a user device 102) that may be configurable for each subscriber/user. As used herein, an automatic purchase transaction may refer to a purchase transaction for a product that is generated on behalf of a user without a request from the user to purchase that product. In some implementations, products purchased via such an automatic purchase transaction may be performed at a discount relative to a normal purchase transaction for the product. In some implementations, before generating an automatic purchase transaction on behalf of a user/subscriber for the product corresponding to the new product identifier, the subscription module 132 may also be configured to determine whether the user/subscriber already owns and/or has already purchased the product. Upon a negative determination thereof, that is, it is determined that the user/subscriber does not own and/or has not purchased the product, the subscription module 132 may be configured to proceed with generating the automatic purchase transaction for the product. Upon a positive determination thereof, that is, it is determined that the user/subscriber owns and/or has already purchased the product, the subscription module 132 may not generate the automatic purchase transaction. Instead, the subscription module 132 may be configured to transmit, to the user/subscriber, a notification indicating that the user/subscriber already owns and/or has previously purchased the product corresponding to the new product identifier.

In yet other implementations, automatic purchase transactions for a user/subscriber may be restricted according to a predetermined threshold ratio between a first number of product identifiers corresponding to free products and a second number of product identifiers corresponding to priced products. For example, before generating an automatic purchase transaction for a product on behalf of a user/subscriber, the subscription module 132 may be configured to examine a purchase history of the user/subscriber with respect to automatic purchase transactions. As such, the subscription module 132 may be configured to determine whether the predetermined threshold ratio has been exceeded for the user/subscriber. Upon a negative determination thereof, that is, the predetermined threshold ratio has not been exceeded, the subscription module 132 may be configured proceed with generating the automatic purchase transaction for the product. Upon a positive determination thereof, that is, the predetermined threshold ratio has been exceeded, the subscription module 132 may not generate the automatic purchase transaction. Instead, the subscription module 132 may be configured to transmit, to the user/subscriber, a notification indicating that the predetermined threshold ratio has been exceeded for the user/subscriber. In addition, the notification may indicate that the automatic purchase transaction for the product has therefore been rejected.

In addition, it will be appreciated that the product list application 110, subscription module 132, and/or any other components of the system 100 may be configured to provide the user with various selectable preference options (e.g., via a user device 102) associated with product list subscriptions. For example, one option may enable the user to select notification frequencies (e.g., how often the user is notified) regarding new product identifiers added to the user's respective subscribed product lists. Another option may enable the user to select a number of new product identifiers that may be included in each notification. For example, the user may select an option to be notified once per week of a maximum of five new product identifiers. Another option may enable the user to choose one or more types of communications with which to receive notifications, such as email, text messaging, instant messaging, tweets, and/or the like. Yet another option may enable the user to select whether to participate in automatic purchase transactions for products corresponding to new product identifiers added to subscribed product lists. Another option may enable the user to set any upper and/or lower price limits with respect to automatic purchase transactions. In certain implementations, the user may individually set/select options for automatic purchase transactions for each subscribed product list. It should be noted that the above described options are merely exemplary, and that other numerous other types of options are also contemplated within the disclosure.

According to one or more embodiments, the service provider server(s) 118 may also include a recommendation module 126 to facilitate generating and transmitting recommendations to a user/subscriber. In certain implementations, the recommendation module 126 may be configured to generate recommendations to the user/subscriber based at least in part on respective product lists to which the user/subscriber may be subscribed. For instance, the product list application 110 and/or the recommendation module 126 may be configured to access a user profile associated with the user/subscriber. The user profile may store information indicating a product list to which the user/subscriber maintains a subscription. To this end, the recommendation module 126 may be configured to determine one or more category identifier(s) included in the product list. Based on the category identifier(s), the recommendation module 126 may generate and/or transmit one or more recommendations to the user. For example, the recommendation module 126 may determine that a user/subscriber is subscribed to a book list that includes, belongs to, is classified under, and/or or is otherwise associated with a "Fantasy" genre identifier. Based at least in part on the user's/subscriber's subscription to the book list, the recommendation module 126 may be configured to transmit a recommendation for the user/subscriber to purchase another book that belongs to the "Fantasy" genre identifier. Additionally or alternatively, the recommendation module 126 may also be configured to generate/transmit, to the user, a recommendation to subscribe to another book list that includes, belongs to, or is otherwise associated with the "Fantasy" genre identifier.

In other embodiments, the recommendation module 126 may be configured to generate recommendations based on a creator identifier included in the product list. As previously discussed, the creator identifier may include any information that can be used to ascertain a creator, such as a string of characters, an identification number, and/or the like. To this end, the recommendation module 126 may be configured to determine and/or identify (e.g., via the product list search module 130) another book list that includes the creator identifier. For instance, a user may be subscribed to a book list, which is associated with a creator identifier corresponding to "Phil Jackson". The recommendation module 126 may be configured to determine and/or identify (e.g., via the product list search module 130) a second book list that includes or is otherwise associated with the creator identifier corresponding to "Phil Jackson." As such, the recommendation module 126 may generate and/or transmit a recommendation to a user device 102 for the user to subscribe to the second book list.

According to other embodiments, the recommendation module 126 may also be configured to generate recommendations based at least in part on sensor data received from the user device(s) 102. For instance, the user device(s) 102 may include one or more sensors (not pictured) capable of gathering information associated with a present environment of the user device(s) 102. For example, the user device 102 may be configured to obtain sensor data including, but not limited to, image data, audio data, location data, and/or the like associated with a present environment. The sensor data may be generated via various sensors (e.g., camera, microphone, antenna, Global Positioning Satellite (GPS) device, etc.), and input to the user device via one or more network and I/O interfaces 112. To this end, the product list application 110 may be configured to access the sensor data and transmit the sensor data to the recommendation module 126. Furthermore, the recommendation module 126 may identify a product list to which a user of the user device 102 is subscribed. Based at least in part on the sensor data and product list, the recommendation module may generate and/or transmit one or more recommendations to the user. For instance, the recommendation module 126 may receive location data via a user device 102 of the user. Additionally, the recommendation module 126 may determine that the user is subscribed to one or more book lists. Furthermore, the location data may indicate that one or more book stores are located relatively nearby to the user. Thus, the recommendation module 126 may generate one or more recommendations and transmit the recommendations to the user device 102 for the user to view and subsequently visit the book stores.

It should be noted that the recommendation module 126 is not limited to any particular framework for generating and/or transmitting recommendations and that the above descriptions are merely exemplary. Furthermore, the recommendation module 126 may be capable of generating and/or transmitting a wide variety of recommendations including, but not limited to, product recommendations, product list recommendations, product list creator recommendations, recommendations to subscribe to book lists created by particular users, and/or the like. Additionally, the recommendation module 126 may generate and/or transmit recommendations based on a wide range of different criteria such as a user's purchase history, a user's browsing history, and other types of data related to the user.

Figure 2:
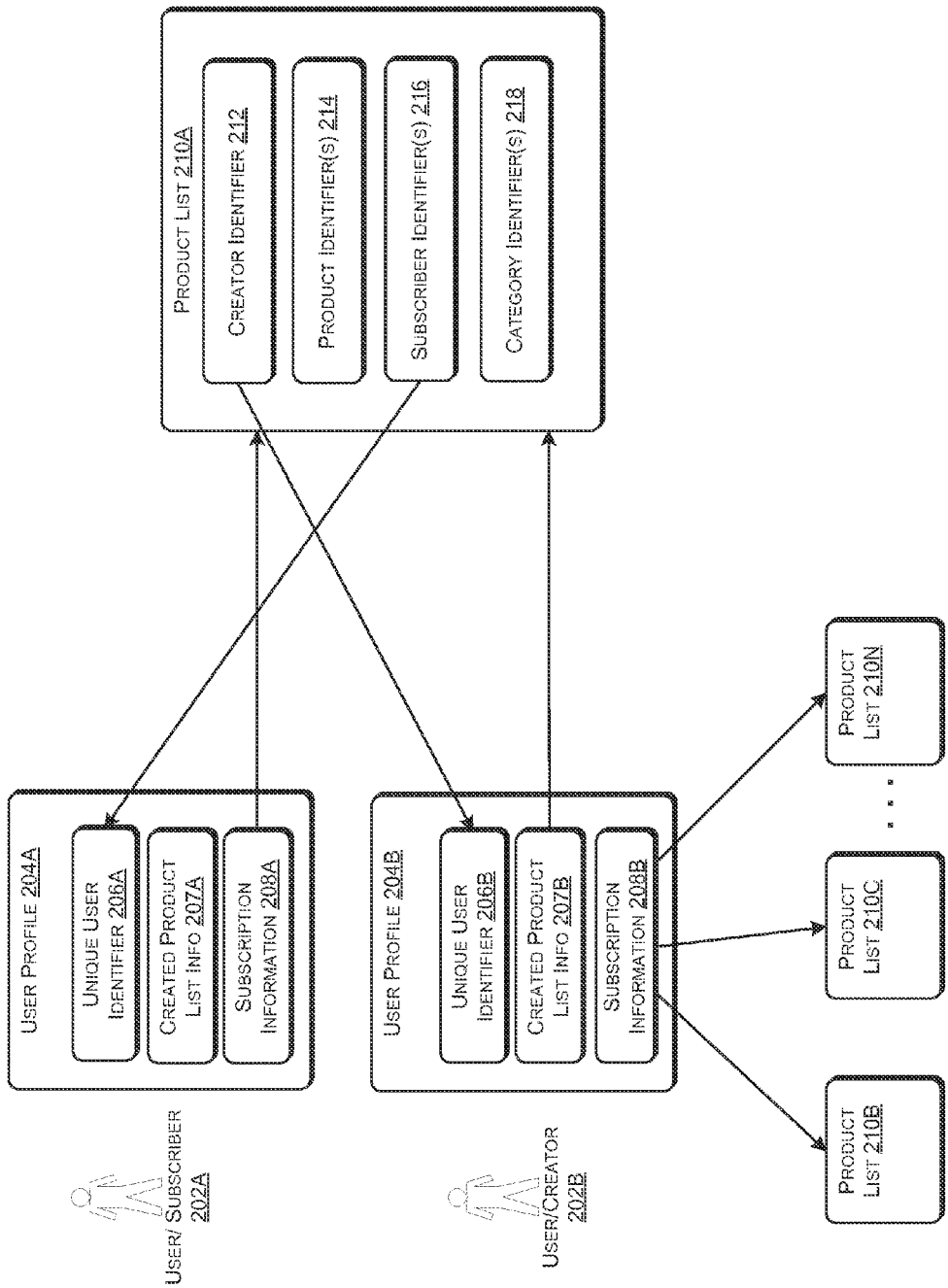
FIG. 2 illustrates a block diagram of product list information for managing product list subscriptions in accordance with one or more embodiments of the disclosure.

Turning now to FIG. 2, a block diagram 200 is provided that illustrates one or more relationships for managing product list subscriptions in accordance with one or more example embodiments. The block diagram 200 may illustrate relationships between a user/subscriber 202A, a user/creator 202B, their respective user profiles 204A, 204B, and one or more product lists 210A-210N, It will be appreciated that the components illustrated in the block diagram may be stored in any combination of the user device(s) 102, service provider server(s) 118, database 140, and/or any other data storage devices.

In certain embodiments, the user/subscriber 202A and user/creator 202B may be associated with respective user profiles 204A, 204B. Each user profile 204A, 204B may include respective unique user identifiers 206A, 204B for their respective users 202A, 202B, created product list information 207A, 207B, and subscription information 208A, 208B. As previously discussed, a user profile such as 204A may be associated with a particular user such as 202A upon the user's 202A enrollment in a service for managing product list subscriptions. This service may be provided by an online merchant, owner, and/or any other service provider associated with the service provider server(s) 118. To this end, a user profile such as 204A may store a unique user identifier such as 206A in order to distinguish the user 202A from other users, such as 202B.

According to one or more embodiments, the created product list information 207A, 207B may indicate any product lists that have been created by a particular user such as 202B. As shown in FIG. 2, the user/creator 202B may be the creator of a particular product list such as 210A. To this end, the created product list information 207B may point to, indicate, and/or otherwise be associated with the product list 210A. Thus, the product list application 110 and/or any of the modules included in the service provider server(s) 118 may be configured to access the created product list information such as 207B to determine and/or identify any number of product list(s) such as 210A-210N created by the user such as 202B. Furthermore, though not specifically illustrated in FIG. 2, it will be appreciated that created product list information 207A, 207B may include pointers to or may otherwise be associated with one or more product lists 210A-210N.

Additionally, the user profile such as 204A may include subscription information such as 208A indicating product list(s) such as 210A to which the user such as 202A may be subscribed. As shown in FIG. 2, the user/subscriber 202A may be subscribed to product list 210A, while the user/creator 202B may be subscribed to product lists 210B-210N. Thus, in order to represent these subscription relationships, the subscription information 208A, included in the user profile 204A, may include a pointer to, may indicate, and/or may otherwise be associated with the product list 210A. Similarly, the subscription information 208B, included in the user profile 204B, may include respective pointers to, may indicate, and/or may otherwise be associated with product lists 210B-210N. However, it will be appreciated that the particular subscription relationships illustrated in FIG. 2 are merely exemplary, and that the subscription information 208A, 208B may be associated with any number of product lists. Under this framework, in order to determine which respective product lists 210A-210N that a user 202A, 202B may be subscribed to, the product list application 110, the modules of the service provider server(s) 118, and/or any combination thereof may be configured to access the subscription information 208A, 208B included in the respective user profiles 204A, 204B.

According to certain implementations, the product list 210A may include, store, and/or otherwise be associated with a creator identifier 212, one or more product identifier(s) 214, and/or one or more subscriber identifier(s) 214. Similarly, the product lists 210B-210N may include like components, respectively. The creator identifier 212 may be operable to ascertain the creator of the product list 210A. Again, as shown in FIG. 2, the user/creator 202B may be the creator of product list 210A. Thus, the creator identifier 212 may include a pointer to, may indicate, and/or may otherwise be associated with the unique user identifier 206B. Alternatively, the creator identifier 212 may be a copy of the unique user identifier 206B. Thus, operations that facilitate the determination of the creator of the product list 210A, may access and/or analyze the creator identifier 212 included in the product list 210A.

The product identifier(s) 214 may include pointers to or may indicate, represent, correspond to, and/or may otherwise be associated with actual products for sale by a service provider associated with the service provider server(s) 118. Thus, broadly, a product list 210A-210N may be generally construed as a collection of product identifiers 214. To this end, the product list application 110 and/or the product list generation module 128 may enable the user/creator 202B to select the particular product identifier(s) 214 to be included in a particular product list such as 210A. Furthermore, after the product list 210A has been created, the product list application 110 and/or the product list generation module 128 may enable the user/creator 202B to add new product identifiers to a particular product list such as 210A.

The subscriber identifier(s) 216 may include pointers to or may indicate, represent, correspond to, and/or may otherwise be associated with respective subscribers of a particular product list such as 210A. As shown in FIG. 2, the user/subscriber 202A may be subscribed to the product list 210A. In order to indicate this subscription relationship, a subscriber identifier(s) 216 may include a pointer to the unique user identifier 206A. Alternatively, the subscriber identifier(s) 216 may include a copy of the unique user identifier 206A. It will be appreciated that the subscriber identifier(s) 216 may include multiple pointers to multiple users/subscribers. To this end, operations that facilitate the identification and/or determination of subscribers to a particular product list such as 210A, may access and/or analyze the subscriber identifier(s) 216 included in the product list 210A.

In certain embodiments, the product list such as 210A may also include category identifier(s) 218. For example, a product list such as 210A may be arranged, grouped, classified, belong to, and/or otherwise be associated with the various category identifiers 218. In certain implementations, the category identifier(s) 218 may correspond to and/or indicate any categories that products of the product identifier(s) 214 belong to. For example, a product list such as 210A can be a book list, which may include a product identifier 214, such as a book identifier. The product identifier may correspond to a book about basketball, classified (e.g., by the service provider of the service provider server 118) under multiple categories, such as "book," "sports," and "paperback." To this end, the category identifier(s) 218 of the product list 210A may at least include, store, correspond to, or may otherwise be associated with categories such as "book," "sports," and "paperback" categories.

It will be appreciated that any of the identifiers included in the product list 210A (e.g., creator identifier 212, product identifier(s) 214, subscriber identifier(s) 216, and/or category identifier(s) 218) may include various types of data, such as a string of characters, an identification number, and/or the like. Furthermore, it will be appreciated that the product list 210A may include product identifier(s) 214 corresponding to various types of merchandise and/or articles, both digital and physical, including, but not limited to, books, electronic devices, clothing, furniture, vehicles, hardware, tools, food and drink, and/or the like. With respect to books in particular, references to product lists may be referred to as book lists, references to product identifier(s) 216 may be referred to as book identifier(s), and references to category identifier(s) 218 may be referred to as genre identifier(s). Further still, it should be appreciated that the user profiles 204A, 204B and/or the product lists 210A-210N are not limited to the respective data and/or components illustrated in FIG. 2 and may include fewer or more components in other implementations. For example, the product list 210A may include other additional information such as various counters corresponding to the number of product identifier(s) 214 and/or subscriber identifiers(s) 216, popularity indices and other rank information, multimedia data, and/or the like.

Figure 3:
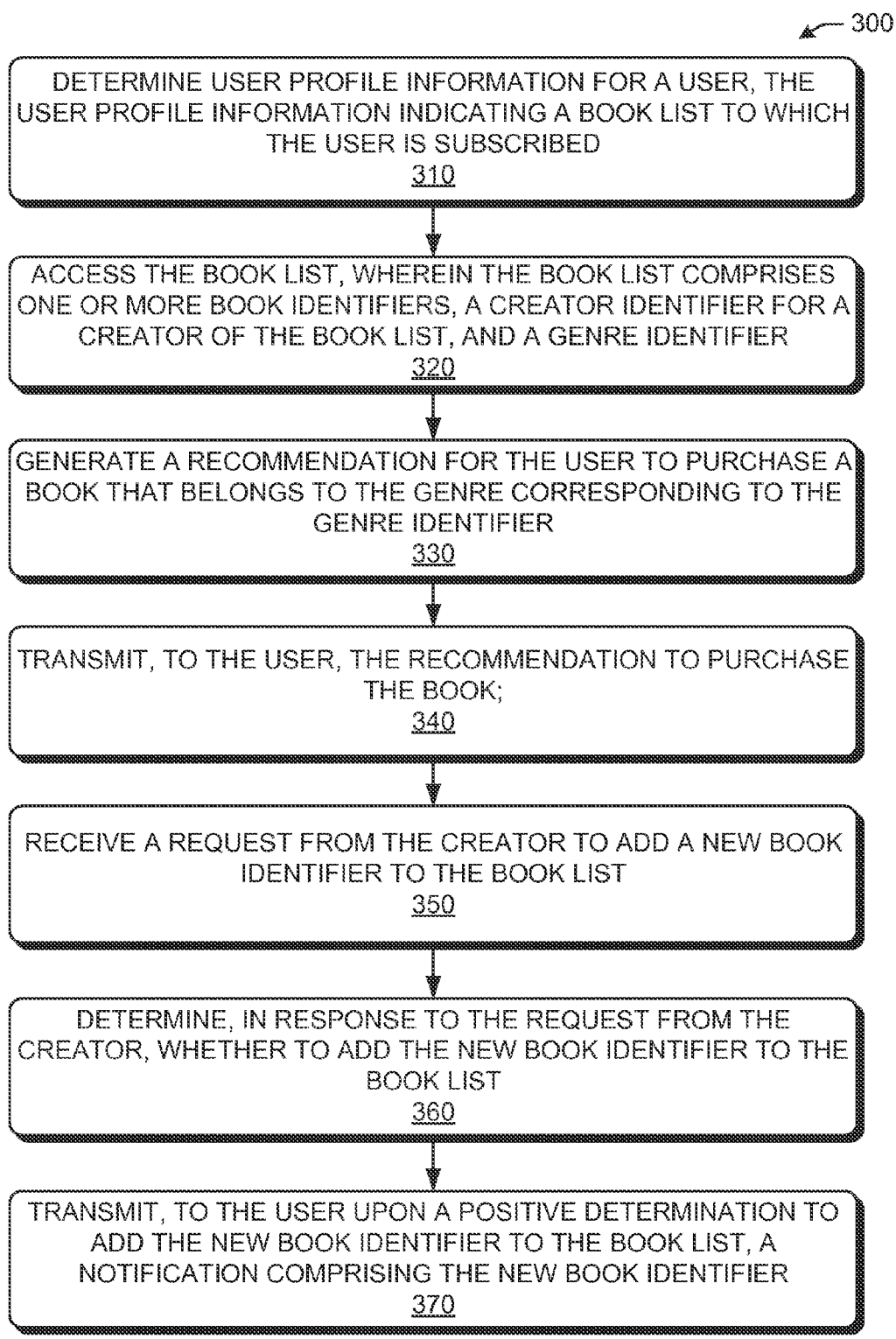
FIG. 3 illustrates a flow diagram for managing product list subscriptions in accordance with one or more embodiments of the disclosure.

FIG. 3 illustrates a flow diagram of a method 300 for managing product list subscriptions in accordance with one or more embodiments of the disclosure. In block 310, a service provider server 118 may determine (e.g., via the subscription module 132) user profile information for a user, such as user/subscriber 202A. As such, the user profile information (e.g., the subscription information 208A included in a respective user profile 202A) may indicate a book list, similar to product list 210A, to which the user is subscribed.

In block 320, the service provider server 118 may access the book list. The book list may include one or more book identifiers, similar to product identifier(s) 214, a creator identifier 212 for a creator of the book list and a genre identifier, similar to category identifier(s) 218.

In block 330, the service provider server 118 (e.g., via the recommendation module 126) may be configured to generate a recommendation via a user interface 102 for the user/subscriber 202A to purchase a book that belongs to a genre corresponding to the genre identifier, and in block 340, the service provider server 118 may transmit the recommendation to the user/subscriber 202A via the user device 102.

In block 350, the service provider server 118 may receive a request from a user, such as user/creator 202B (e.g., via the product list generation module 128) to add a new book identifier to the book list. In other words, the creator of the book list may wish to add a new book to the book list. In response to the request, in block 360, the service provider server 118 (e.g., via the product list generation module 120) may determine whether to add the new book to the book list. In certain embodiments, this determination may be performed with respect to a comparison between certain book identifiers included in the book list. For example, the product list generation module 128 may be configured to determine a first number of book identifiers, included in the book list, that correspond to free books and a second number of book identifiers, included in the book list, that correspond to paid books. To this end, the product list generation module 128 may calculate a ratio of the first number of book identifiers to the second number of book identifiers and determine if this ratio exceeds a predetermined threshold ratio (e.g., 1:1).

In block 370, the service provider server 118 may transmit (e.g., via the subscription module 132), to the user device 102 associated with the user/subscriber 202A, upon a positive determination to add the new book identifier to the book list 210A, a notification comprising the new book identifier. Thus, the user/subscriber 202A may be informed that the user/creator 202B successfully added the new book identifier to the book list. In certain implementations, the positive determination to add the second book identifier may include a determination by the product list generation module 128 that the ratio of the first number of book identifiers to the second number of book identifiers does not exceed the predetermined threshold ratio.

Figure 4:
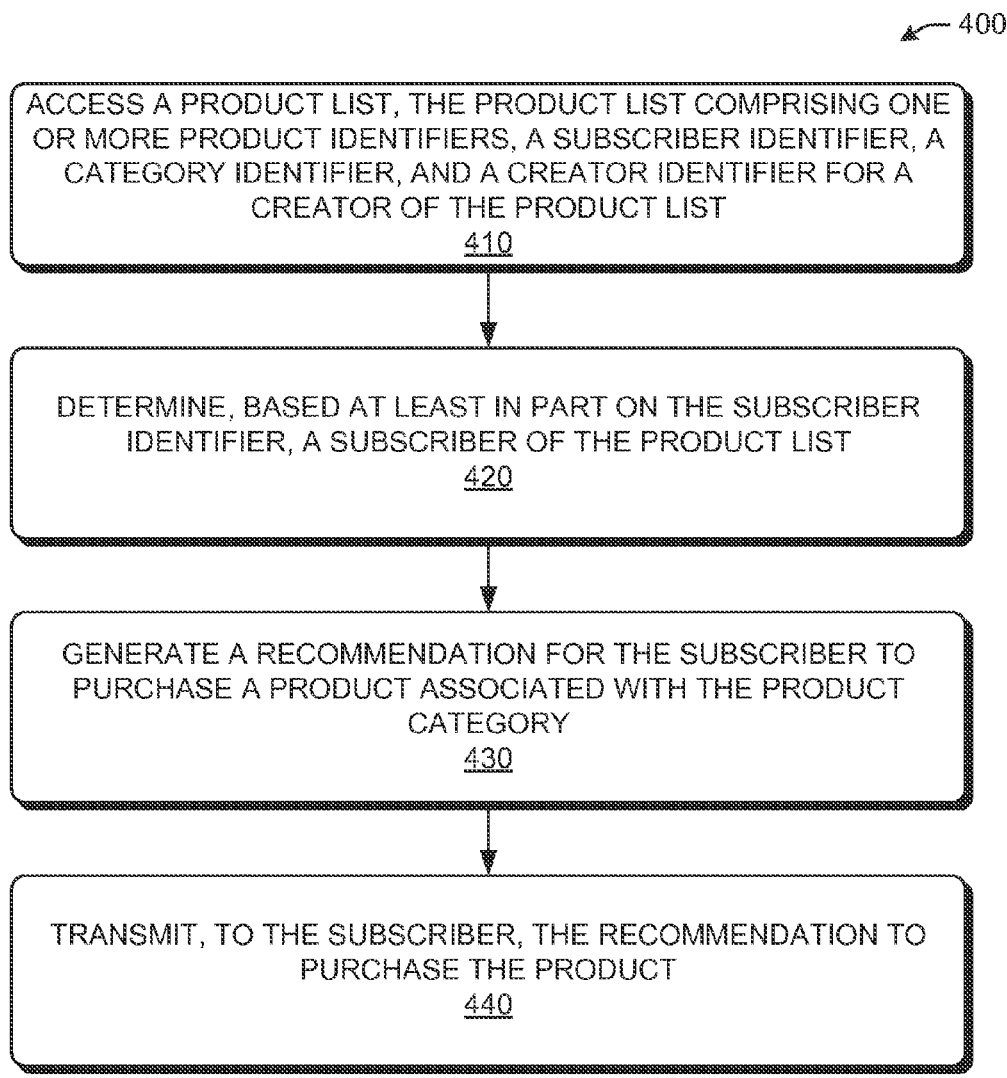
FIG. 4 illustrates another flow diagram for managing product list subscriptions in accordance with one or more embodiments of the disclosure.

FIG. 4 illustrates a flow diagram of a method 400 for managing product list subscriptions according to one or more embodiments of the disclosure. In contrast to the method 300 of FIG. 3, which may be generally directed to analyzing user profiles 202A, 202B, the method 400 of FIG. 4 may be generally directed to analyzing product lists 210A-210N.

The method 400 may begin in block 410 where a service provider server 118 may access a product list, such as 210A. The product list 210A may include one or more product identifiers 214, one or more subscriber identifiers 216, one or more category identifiers 218, and a creator identifier 212 for a creator of the product list 210A. In block 420, the service provider server 118 may determine, based at least in part on the one or more subscriber identifiers 216, a subscriber of the product list 210A. In block 430, the service provider server 118 may generate a recommendation for the subscriber to purchase a product associated with the one or more category identifiers 218. In block 440, the service provider server 118 may be configured to transmit, to the subscriber via a user device 102, the recommendation to purchase the product. It should be noted that while FIG. 4 has been described with reference to the service provider server 118 performing certain operations in blocks 410-440, these operations may also be performed by the product list application 110, another third-party device, and/or any combination thereof.

Figure 5:
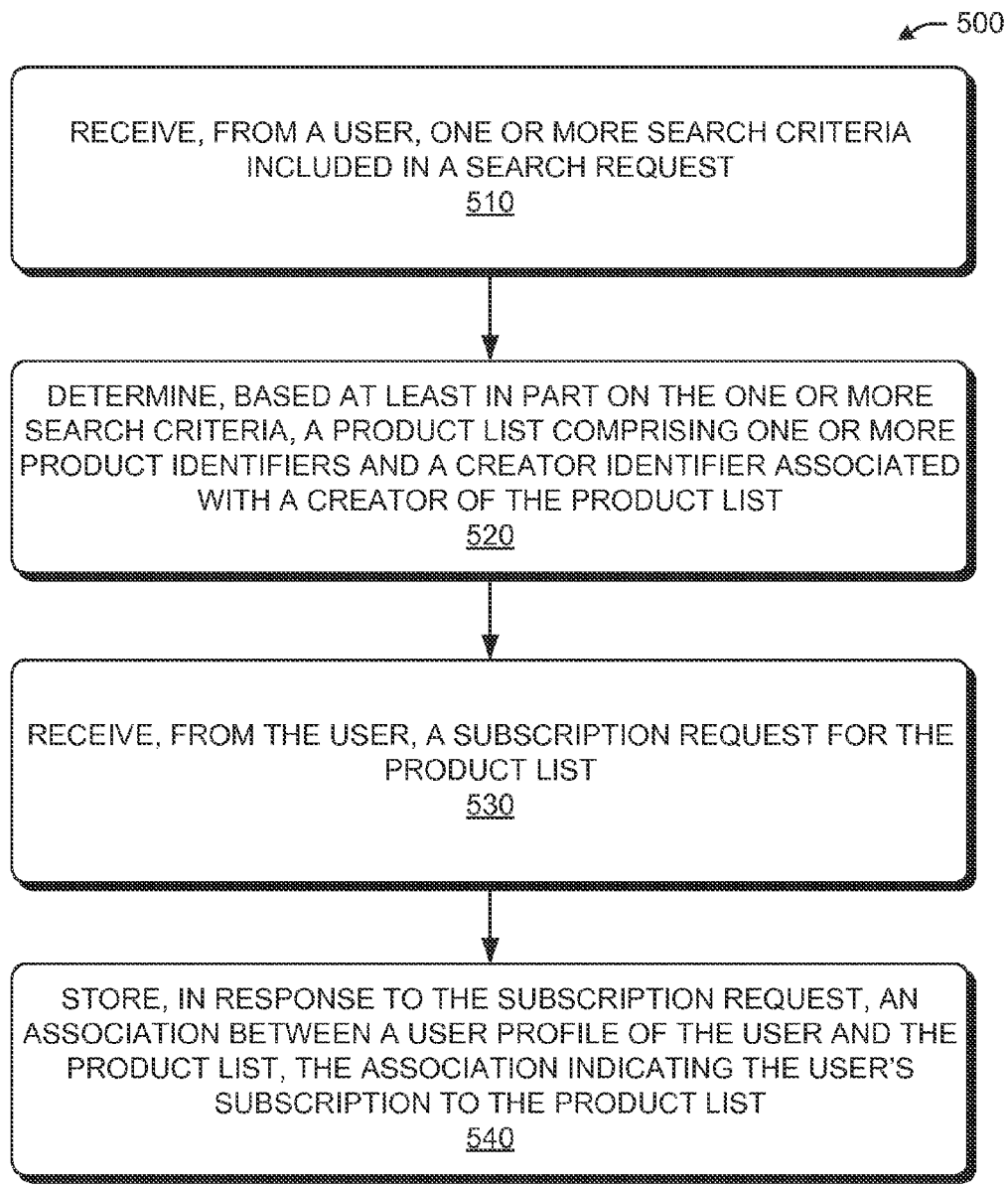
FIG. 5 illustrates another flow diagram for managing product list subscriptions in accordance with one or more embodiments of the disclosure.

FIG. 5 illustrates a flow diagram of a method 500 for managing product list subscriptions in accordance with one or more embodiments of the disclosure. The method 500 may begin in block 510 where the product list application 110 may receive, from a user, such as 202A via a user device 102, one or more search criteria associated with a search request. In block 520, the product list application 110 may determine, based at least in part on the one or more search criteria, a product list such as 210A. The product list such as 210A may include one or more product identifiers 214, and a creator identifier 218 associated with a creator of the product list 210A. In other words, the product list application 110 may facilitate a search for one or more product lists such as 210A that correspond to the search criteria input to the user device 102 by the user.

In block 530, the product list application 110 may receive, from the user, such as 202A via the user device 102, a subscription request for the product list 210A. In block 540, the product list application 110 may store, in response to the subscription request, an association between a user profile of the user 202A and the product list 210A, the association indicating the user's subscription to the product list 210A. It should be noted that while FIG. 5 has been described with reference to the product list application 110 performing certain actions, such actions may also be performed by the service provider server(s) 118, another third-party device, and/or any combination thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
    determining, by a server comprising one or more processors, user profile information for a first user;
    determining, using the user profile information, a book list to which the first user is subscribed, wherein the book list is generated by a second user;
    accessing the book list, wherein the book list comprises one or more book identifiers of books in the book list, a plurality of subscriber identifiers for respective subscribers to the book list, a creator identifier for the second user, and a genre identifier, wherein the plurality of subscriber identifiers comprises a user identifier for the first user;
    generating a recommendation for the first user to purchase a book included in the book list using the one or more book identifiers, wherein the book is classified by the genre identifier;
    transmitting the recommendation to purchase the book;
    receiving a request from the second user to add a new book to the book list, wherein the new book was not previously in the book list, the request comprising a book identifier of the new book;
    determining that the book identifier of the new book is to be added to the book list; and
    transmitting a notification comprising the book identifier to the plurality of subscriber identifiers; and
    automatically causing a shipment of the new book to an address associated with at least one of the plurality of subscriber identifiers after the new book is added to the book list.

2. The method of claim 1, further comprising:
    determining that the first user has not previously purchased the new book;
    generating an automatic purchase transaction for the new book on behalf of the first user.

3. The method of claim 1, wherein determining that the book identifier of the new book is to be added to the book list further comprises:
    determining a first number of book identifiers, included in the book list, that correspond to free books;
    determining a new number of book identifiers, included in the book list, that correspond to priced books; and
    determining whether a ratio of the first number of book identifiers to the new number of book identifiers exceeds a predetermined threshold ratio.

4. The method of claim 3, further comprising:
    generating, upon a determination that the ratio exceeds the predetermined threshold ratio, a new notification, wherein the new notification indicates a violation of the predetermined threshold ratio and a rejection of the creator request; and
    transmitting the new notification to the second user.

5. The method of claim 3, further comprising:
    determining that the ratio of the first number of book identifiers to the new number of book identifiers does not exceed the predetermined threshold ratio; and
    transmitting the new notification comprising the book identifier.

6. The method of claim 1, further comprising:
    identifying a new book list comprising a new creator identifier, the new creator identifier matching the creator identifier of the book list to which the first user is subscribed;
    transmitting a new recommendation for the user to subscribe to the new book list.

7. The method of claim 1, further comprising:
    causing a shipment of the new book to an address associated with at least one of the plurality of subscriber identifiers.

8. A device, comprising:
    at least one processor;
    at least one memory storing computer-executable instructions, that when executed by the at least one processor, causes the at least one processor to:
    access a product list, the product list comprising one or more product identifiers, one or more subscriber identifiers of respective subscribers to the product list, a category identifier, and a creator identifier for a creator that generated the product list;
    determine, based at least in part on the one or more subscriber identifiers, a subscriber of the product list;
    generate a recommendation for the subscriber to purchase a product on the product list, wherein the recommendation is for a product identifier of the one or more product identifiers added to the product list by the creator;
    transmit the recommendation to purchase the product;
    receive a request from the creator to add a new product identifier to the product list;
    add the new product identifier to the product list;
    automatically cause a shipment of a product associated with the new product identifier to an address associated with the subscriber after the new product identifier is added to the product list; and
    transmit a notification comprising the new product identifier to the one or more subscriber identifiers indicating that the new product identifier has been added to the product list.

9. The device of claim 8, wherein the product list comprises at least one of a book list, a fashion list, a vehicle list, an electronic device list, hardware list, food and drink list, or a toy list.

10. The device of claim 8, wherein the instructions further cause the at least one processor to:
    generate, upon a determination that the subscriber has not previously purchased a respective product indicated by the new product identifier, an automatic purchase transaction for the respective product on behalf of the subscriber.

11. The device of claim 8, wherein the computer-executable instructions to determine that the new product identifier is to be added to the product list further comprises computer-executable instructions to:
    determine a first number of product identifiers, included in the product list, that correspond to free products;

determine a new number of product identifiers, included in the product list, that correspond to priced products; and determine whether a ratio of the first number of product identifiers to the new number of product identifiers exceeds a predetermined threshold ratio.

12. The device of claim 11, wherein the computer-executable instructions further cause the at least one processor to:
generate, upon a determination that the ratio exceeds the predetermined threshold ratio, a new notification, wherein the new notification indicates a violation of the predetermined threshold ratio and a rejection of the creator request to add the new product identifier; and
transmit the new notification.

13. The device of claim 11, wherein the computer-executable instructions to determine that the new product identifier is to be added to the product list comprises instructions to:
determine that the ratio does not exceed the predetermined threshold ratio; and
transmit the new notification comprising the new product identifier.

14. The device of claim 8, wherein the instructions further cause the at least one processor to:
identify a second product list comprising a second creator identifier that matches the creator identifier of the product list;
transmit a second recommendation for the subscriber to subscribe to the second product list.

15. A non-transitory computer readable medium comprising instructions that when executed by at least one processor, cause the at least one processor to:
receive, from a user, one or more search criteria included in a search request;
determine, based at least in part on the one or more search criteria in the search request, a product list comprising one or more product identifiers and a creator identifier associated with a creator of the product list;
receive, from the user, a subscription request for the product list;
store, in response to the subscription request, an association between a user profile of the user and the product list, the association indicating the user's subscription to the product list;
receive a request from the creator to add a new product identifier to the product list;
determine that the new product identifier is to be added to the product list; and
transmit a notification comprising the new product identifier to the user indicating that the new product identifier has been added to the product list; and
automatically cause a shipment of a product associated with the new product identifier to an address associated with the user after the new product identifier is added to the product list.

16. The computer readable medium of claim 15, wherein the one or more product lists comprises at least one of a book list, a fashion list, a vehicle list, an electronic device list, hardware list, food and drink list, or a toy list.

17. The computer readable medium of claim 15, wherein the search criteria comprise at least one of a product category, a product list identifier, a creator identifier, subscriber identifier, or a number of subscriptions.

18. The computer readable medium of claim 15, wherein the computer-executable instructions further cause the at least one processor to:
identify, based at least in part on the one or more product identifiers, a product category;
generate a recommendation for the user to purchase a product associated with the product category; and
transmit the recommendation to purchase the product.

19. The computer readable medium of claim 15, wherein the instructions further cause the at least on processor to:
generate, upon a determination that the user has not previously purchased a respective product indicated by the new product identifier, an automatic purchase transaction for the respective product on behalf of the user.

20. A method, comprising:
accessing a product list, the product list comprising one or more product identifiers, one or more subscriber identifiers, a category identifier, the product list associated with a creator identifier indicative of a creator of the product list;
determining, based at least in part on the one or more subscriber identifiers, a subscriber of the product list;
generating a recommendation for the subscriber to purchase a product associated with the category identifier, wherein the product is selected from the one or more product identifiers;
transmitting the recommendation to purchase the product;
receiving a request from the creator to add a new product identifier to the product list;
adding the new product identifier to the product list;
automatically causing a shipment of a product associated with the new product identifier to an address associated with the subscriber after the new product identifier is added to the product list; and
transmitting a notification comprising the new product identifier to the subscriber indicating that the new product identifier has been added to the product list.

21. The method of claim 20, further comprising:
generating, upon a determination that the subscriber has not previously purchased a respective product indicated by the new product identifier, an automatic purchase transaction for the respective product on behalf of the subscriber.

22. The method of claim 20, wherein determining whether to add the new product identifier to the product list further comprises:
determining a first number of product identifiers, included in the product list, that correspond to free products;
determining a new number of product identifiers, included in the product list, that correspond to priced products; and
determining whether a ratio of the first number of product identifiers to the new number of product identifiers exceeds a predetermined threshold ratio.

23. The device of claim 22, further comprising:
generating, upon a determination that the ratio exceeds the predetermined threshold ratio, a new notification, wherein the new notification indicates a violation of the predetermined threshold ratio and a rejection of the creator request to add the new product identifier; and
transmitting the new notification.

* * * * *